United States Patent [19]  [11] Patent Number: 4,597,007
Reitmeier et al.  [45] Date of Patent: Jun. 24, 1986

[54] CIRCUITRY FOR CORRECTING FRAME COMBED LUMINANCE SIGNAL FOR MOTION INDUCED DISTORTION

[75] Inventors: Glenn A. Reitmeier, Trenton, N.J.; Christopher H. Strolle, Glenside, Pa.

[73] Assignee: RCA Corporation, Princeton, N.J.

[21] Appl. No.: 577,507

[22] Filed: Feb. 6, 1984

[51] Int. Cl.$^4$ .................. H04N 9/535; H04N 5/21
[52] U.S. Cl. ........................................ 358/31; 358/36
[58] Field of Search .............. 358/31, 36, 37, 166, 358/167

[56] References Cited

U.S. PATENT DOCUMENTS

| 4,232,330 | 11/1980 | Heitmann | 358/31 |
| 4,296,436 | 10/1981 | Achiha | 358/167 |
| 4,343,019 | 8/1982 | Lagoni | 358/31 |
| 4,498,099 | 2/1985 | Pritchard | 358/31 |
| 4,498,100 | 2/1985 | Bunting et al. | 358/31 |

FOREIGN PATENT DOCUMENTS

| 3007520 | 9/1981 | Fed. Rep. of Germany . |
| 0123280 | 9/1980 | Japan | 358/31 |
| 2035745 | 6/1980 | United Kingdom | 358/31 |
| 2114848 | 8/1983 | United Kingdom | 358/31 |

OTHER PUBLICATIONS

Pritchard, "ACCD Comb Filter for Color TV Receiver Picture Enhancement", RCA Review, vol. 41, Mar. 1980, pp. 3-28.
"A Motion-Adaptive System for Converting Color TV Signals into High Definition Signals", ITEJ, 7-20-80.

Primary Examiner—John C. Martin
Assistant Examiner—Michael P. Dunnam
Attorney, Agent, or Firm—Eugene M. Whitacre; Paul J. Rasmussen; Eric P. Herrmann

[57] ABSTRACT

A frame comb filter system includes circuitry for reducing motion induced artifacts in reproduced images. Frame comb filtered chrominance signal is line comb filtered to extract motion induced luminance cross components therein. The luminance cross components are added to frame comb filtered luminance signal to reduce motion induced luminance signal errors. The corrected luminance signal is then subtracted from composite video signal to produce the chrominance component of composite video.

10 Claims, 5 Drawing Figures

CIRCUITRY FOR CORRECTING FRAME COMBED LUMINANCE SIGNAL FOR MOTION INDUCED DISTORTION

BACKGROUND OF THE INVENTION

This invention relates to frame-to-frame comb filters for separating the luminance (Y) and chrominance (C) components of composite television signals and more particularly to means for correcting signal distortion due to the occurrence of motion between successive video frames in such a comb filter system.

Electronic signals which are periodic in nature may be processed advantageously by storing replicas of the signal which are separated in time by the repetition period and then combining the stored replicas to enhance information content of the signal. For example, conventional NTSC television broadcast systems (and most video record/playback systems) are arranged so that much of the brightness (luminance) information contained in an image is represented by signal frequencies which are concentrated about integral multiples of the horizontal line scanning frequency. Color (chrominance) information is encoded or inserted in a portion of the luminance signal spectrum around frequencies which lie halfway between the multiples of line scanning frequency (i.e., at odd multiples of one-half the line scanning frequency).

Chrominance and luminance information can be separated and detail information may be enhanced by appropriately combing the composite signal spectrum. Known combing arrangements take advantage of the fact that the odd multiple relationship between chrominance signal components and half the line scanning frequency causes the chrominance signal components for corresponding image areas on successive lines to be 180° out of phase with each other (so-called interlace frequency components). Luminance signal components for corresponding image areas on successive lines are substantially in phase with each other (and comprise non-interlaced components).

In a comb filter system, one or more replicas of the composite image-representative signal are produced which are time delayed from each other by at least one line scanning interval such that the phase of delayed and non-delayed chrominance component are 180° out of phase. The delayed signals are added to non-delayed signals, resulting in the cancellation of the interlaced frequency components (e.g., chrominance) while reinforcing the non-interlaced frequency components (e.g., luminance). By subtracting the delayed and non-delayed signals (e.g., by inverting one of the signals and then adding the two), the non-interlaced frequency components are cancelled while the interlaced frequency components are reinforced. Thus, the luminance and chrominance signals may be mutually combed and thereby may be separated advantageously. Generally, comb filtered video signal components contain lesser cross components than luminance and chrominance signal components that are separated from composite video signal by previously used methods.

Now consider a stationary picture and a particular pixel of that scene. It will be appreciated that the level of redundancy of the signal representing that pixel on a frame-to-frame basis will be substantially one hundred percent. Thus, if comb filtering is were performed on a frame-to-frame basis, the percentage of residual luminance signal in the combed chrominance signal will be substantially zero. Similarly the residual chrominance signal in the combed luminance signal will be substantially zero. By design, the chrominance signal of an NTSC composite signal is synchronized to have a 180 degree phase relationship from frame to frame permitting comb filtering on a frame basis. The luminance component may therefore be extracted by linear addition of the composite signal from successive frames and the chrominance component may be extracted by linear subtraction of the composite signal from successive frames. The response characteristic of a frame-to-frame comb filter has nulls or teeth spaced at 30 Hz intervals.

In the frame-to-frame combing process, non-stationary objects give rise to distortions in the reproduced images. These distortions are due to signal changes from a given pixel from frame to frame and result in incomplete cancellation of the luminance and chrominance components in the combed chrominance and combed luminance signals respectively as well as an effective bandwidth reduction of the luminance signal in the regions of motion. Residual signals resulting from incomplete cancellation are designated herein as cross components.

Differences in scene content due to object motion or camera panning, that occur in the time frame of one-thirtieth of a second or faster are characterized as being visual motion of the scene content. The motion induced distortions created by the frame-to-frame combing process are two dimensional. The distortions are observable in both the horizontal and vertical directions in the plane of the image and are manifested as dual images in the reproduced scenes. The dual images are separated by an amount corresponding to the rate of motion and may consist of incorrect hue at the edges of moving colored objects, objectionable dot structure on edges of colored objects and low frequency color edge beats.

It is an object of the present invention to reduce the objectionable effects produced by motion in a frame-to-frame combing system.

BRIEF SUMMARY OF THE INVENTION

The present invention is a video frame comb filter system including circuitry for correcting errors in the comb filtered luminance signal that occur due to interframe image changes or motion. The system includes a frame comb filter which produces separated luminance and chrominance signals, both of which contain undesirable signal artifacts when interframe motion occurs. An interline comb filter is coupled to receive the separated chrominance signal and which provides first and second output signals. The first output of the interline comb filter provides broadband luminance cross components which occur in the chrominance signal during motion intervals. The second output signal provides chrominance signal plus further luminance cross components during motion intervals. The second output of the interline comb filter is coupled to a low pass filter which removes the chrominance signal. The low passed further luminance signal and the broadband luminance cross components are combined and then added to the separated comb filtered luminance signal from the frame comb filter to generate corrected luminance signal during motion intervals.

DETAILED DESCRIPTION OF THE INVENTION

Figure 1:
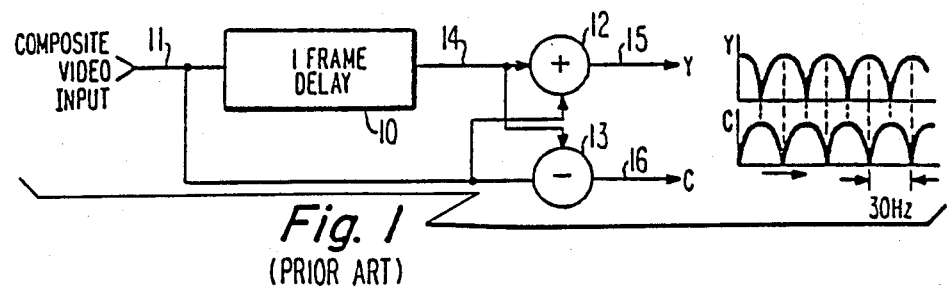
FIG. 1 is a block diagram of a frame-to-frame comb filter known in the art of TV signal processing.

FIG. 1 illustrates the basic frame-to-frame comb filter. For purposes of illustration, the apparatus will be described in terms of separating luminance and chrominance signals from a composite TV signal, however, the apparatus is not limited to this particular application. For example, the apparatus of FIG. 1 may be used to comb filter luminance signal for insertion of chrominance signal therein in the formation of a composite video signal.

In FIG. 1, a storage element 10 having the capacity to store the electrical manifestation of one frame (e.g., two fields of NTSC video format) of video signal, sequentially accepts signal from connection 11 and outputs the same signal onto connection 14 delayed by the duration of one frame period. The element 10 may comprise a digital memory, e.g., a random access memory (RAM) with the appropriate support electronics or an analog memory, e.g., a serial charge transfer device (CTD) such as a CCD with its necessary supporting circuitry. Conceptually it does not matter whether element 10 is a digital or analog circuit, since current technology permits video signal processing in either the digital or analog domain. For descriptive purposes, the memory will be assumed to be digital in nature. The remaining circuit elements incorporated therewith will also be considered to be of digital design to obviate digital-to-analog signal conversion between the circuit elements.

Input signal from connection 11 and delayed signal from connection 14 are summed together in the ADDER circuit 12. The luminance components of signal being in phase add while the chrominance components being 180 degrees out of phase cancel, to produce a substantially chrominance free luminance signal Y at connection 15. Input signal and delayed signal are also applied to the SUBTRACTOR circuit 13 wherein the chrominance components of the consecutive frames sum constructively while the luminance components cancel to produce a substantially luminance free chrominance signal on connection 16 (at least when successive frame signals are records of the same stationary scene).

Figure 2:
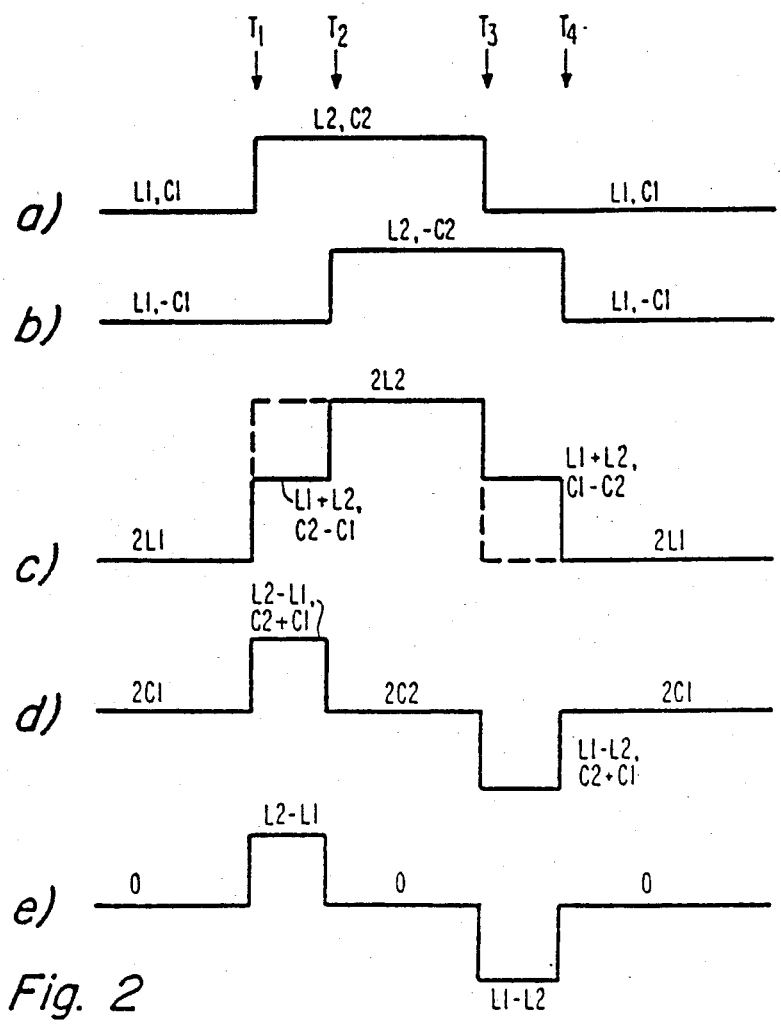
FIGS. 2a–e are amplitude versus time waveforms associated with the FIG. 1 circuit.

Referring to FIG. 2, the effects of motion on the aforedescribed frame-to-frame combing process is graphically illustrated. FIG. 2a represents a portion of the composite signal at an arbitrary time interval. FIG. 2b represents the composite video signal from the same scene exactly one frame period later in time, and wherein some motion has occurred in the scene. In waveform 2a, assume that the signal component between times T1 and T3 represents an object having luminance and chrominance signal parameters L2 and C2 respectively and is located in an area of uniform scene content having luminance and chrominance signal parameters L1 and C1 respectively. Between frames, the object moves spatially causing the video signal representation of the object to translate temporally, i.e., to fall between times T2 and T4 in FIG. 2b. The relative signal parameters L and C of the luminance and chrominance components of signal remain the same between the FIGS. 2a and 2b waveforms though there exists a time shift with respect to the object represented by L2, C2. The chrominance component of the signal, however, has a 180° degree phase relationship between waveforms 2a and 2b (i.e., between frames). The sum and difference of the FIGS. 2a and 2b waveforms are represented by the waveforms 2c and 2d respectively. It is seen that for those segments of time in which the absolute value of the chrominance vector component between the 2a and 2b waveforms is the same, substantially complete cancellation of the chrominance component results from summing the two waveforms (FIG. 2c). Similarly, where the amplitude of the luminance component of the signal is the same between the two waveforms (2a and 2b) substantially complete cancellation of the luminance component results from a subtraction of the two waveforms (FIG. 2d). FIGS. 2a, 2b, 2c and 2d are representative of signals occurring respectively at connections 11, 14, 15 and 16 of the FIG. 1 circuit.

Over the period where motion occurs between frames, i.e., between times T1 and T2 and times T3 and T4, unequal signals are being differential summed, and incomplete cancellation of the undesired component occurs. In addition, the motion causes an averaging of the signal over the periods where motion occurs. These averages are represented in FIG. 2c by the signal segments denoted (L1+L2). Normally the signal from the two frames will be weighted by a factor of ½ before being combined. The amplitude of the combed signal will be ½ the values shown and the signal during the motion period will be (L1+L2)/2. The averages (L1+L2) in the luminance signal tend to replicate the signal transitions to produce a double or phantom image which circumscribes the moving object. The averages (C1+C2) in the combed chrominance signal during periods of interframe motion tend to distort the hue around the moving object.

Low pass filtering the combed chrominance signal of FIG. 2d produces the signal shown in FIG. 2e. In FIG. 2e, the chrominance signal spectrum has been removed, leaving only the uncancelled luminance component resulting from the interframe motion. If the signal of FIG. 2e is added or subtracted to the signal of FIG. 2c, the luminance signal transitions representing the edges of the moving object will be restored and in phase with the luminance component of the composite signal represented by FIG. 2a. Addition of the FIG. 2e signal will restore the luminance signal of FIG. 2c between the times T1 to T2 to the level of 2L2 and reduce the luminance signal between times T3 and T4 to the value of 2L1 as indicated by the broken lines. Alternatively subtraction of the signal represented by FIG. 2e from signal represented by FIG. 2c will produce a corrected luminance signal in phase with the luminance component of the composite signal represented by FIG. 2b.

Adding signals derived from low pass filtering the comb filtered chrominance component back into the comb filtered luminance signal does not effect complete restoration of the luminance signal, i.e. phantom images are not completely eliminated. The reason for this is that the bandwidth of the compensating signal is narrower than the luminance bandwidth due to the low pass filter. Higher frequency components of the signal needed to completely compensate or correct the luminance signal reside in the spectral band occupied by the chrominance signal. By virtue of low pass filtering the chrominance signal to obtain the compensating signal, the higher frequency compensating components are necessarily excluded from the filter output signal.

Two methods may be employed to account for the missing high frequency compensating signal components. In a first method, the luminance signal is low pass filtered during interframe image motion periods with a low pass filter having a similar frequency response to the low pass filter which produces the compensating signal. Low pass filtering the luminance signal has the effect of eliminating the high frequency components of the L1+L2 signal illustrated in FIG. 2c. Adding the signal derived from low pass filtering the chrominance signal into the low pass filtered luminance signal will completely compensate the luminance signal in the intervals T1–T2 and T3–T4.

The second method is to extract both the high and low frequency components of the luminance signal contaminating the combed chrominance signal and adding them back into the luminance signal. This may be achieved by subjecting the combed chrominance signal to a line-comb filter. The sum or additive output signal from the line comb contains the broadband luminance cross components present in the frame combed chrominance signal. The difference signal from the line comb filter contains the chrominance signal plus luminance cross components which occur at the nulls of the additive output transfer function. This portion of the luminance cross components contains information relating to vertical motion. The difference signal from the line comb is low pass filtered to eliminate the chrominance signal and combined with the additive signal from the line comb. The combined signal contains the required luminance frequency components to completely compensate luminance motion artifacts in the frame combed luminance signal.

Figure 3:
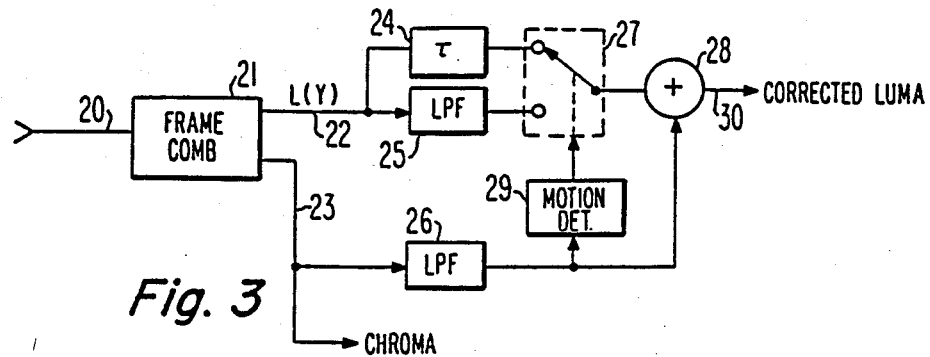
FIGS. 3–5 are block diagrams of frame-to-frame comb filter systems including circuitry for correcting motion induced artifacts in the comb filtered signals.

FIG. 3 is circuitry to perform luminance signal compensation by the first method. In FIG. 3 composite video is applied at terminal 20 to the input connection of a frame comb filter 21. Frame comb 21 may be of the type illustrated in FIG. 1 or it may contain multiple frame or multiple field delay elements as is known in the art. Frame comb 21 produces a luminance signal component, L, (or more traditionally Y) on output connection 22 and a chrominance signal component, C, on output connection 23. The signal components on output connections 22 and 23 are represented by the FIG. 2c and 2d signals respectively for moving images.

The chrominance component is applied to low pass filter 26 which attenuates or rejects the chrominance signal and outputs the low frequency luminance cross components occurring in the comb filtered chrominance signal in the presence of motion. The low pass filtered signal is applied to one input terminal of signal combining circuit 28. Note that in the absence of motion, low pass filter 26 produces no motion descriptive signal. Therefore, if a threshold detector, 29, is connected at the output terminal of the low pass filter 26, the occurrence of interframe motion may be detected.

As mentioned previously, to completely compensate or correct the motion induced artifacts in the luminance signal, the frame combed luminance signal should also be low pass filtered. The frequency response of the luminance low pass filter should correspond to the frequency response of the chrominance low pass filter. However, it is undesirable to low pass filter the luminance signal in the absence of motion since to do so will eliminate high frequency detail in the reproduced image. The loss of detail in the immediate area of moving objects is significantly less noticeable or objectionable. Thus, the circuitry is arranged to low pass filter the luminance signal only when motion is detected.

In FIG. 3, the luminance signal on connection delay element 24. Delay element 24 delays the luminance 22 is applied to both a low pass filter 25 and a signal signal by a period of time equivalent to the group delay of filters 25 and 26. Output signals from delay element 24 and low pass filter 25 are applied to respective poles of switch 27. Switch 27 responsive to signal from motion detector 29 applies delayed luminance signal from delay element 24 to a second input terminal of signal combining circuitry 28 in the absence of interframe motion. Switch 27 alternatively applies low pass filtered luminance signal from filter 25 to circuitry 28 on the occurrence of interframe motion.

Signal combining circuitry 28 linearly adds the luminance signal and the luminance cross components extracted from the combed chrominance signal to produce a motion corrected luminance signal on output terminal 30.

Two comments are in order at this point. First it may be noted from FIG. 2c that the frame combed luminance signal contains chrominance signal contamination (i.e. C2–C1), during motion intervals. This chrominance signal contamination is, however, removed by low pass filter 25 in the luminance signal path. Secondly, the motion detector 29 will have an inherent delay between motion signal occurring at its input terminal and a motion detection signal at its output terminal. Therefore, it may be necessary to include signal delays to account for the detector delay, e.g. in the luminance path before low pass filter 25 and delay element 24 and after the interconnection of the motion detector in the low passed filter 26 signal path.

Figure 4:
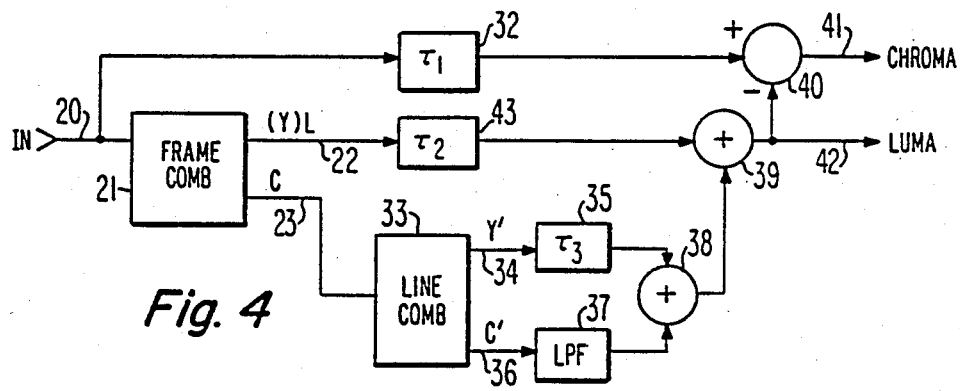

FIG. 4 shows an exemplary circuit for performing luminance motion compensation by the second aforedescribed method. In the following figures, elements designated with like numerals to those of FIG. 3 designate similar elements. As in FIG. 3, the FIG. 4 frame comb filter 21 develops on connections 22 and 23 comb filtered luminance and chrominance signals. The comb filtered luminance signal is applied to delay element 43. Delayed luminance from delay element 43 is then applied to one input of signal combining circuit 39. Delay element 43 provides a delay period, t2, equivalent to the delays incurred by the compensating luminance signal described below.

Frame combed chrominance signal on connection 23 is applied to the input terminal of an interline comb filter 33. Interline comb filter 33 may, for example, be similar to the comb filter shown in FIG. 1 with the exception that the one frame delay element be replaced by a one line delay element.

Comb filter 33 provides an additive output signal on connection 34 which contains broadband luminance cross components Y' occurring in the frame comb filtered signal during motion intervals. The additive output response of the line comb filter has nulls at 15.734 KHz intervals. Thus, some of the luminance cross components present in the frame combed chrominance signal are absent from the line combed luminance signal Y'. The missing luminance cross components are present in the difference signal C' provided by the line comb filter 33 on its other output connection 36. Signal C' on connection 36 is applied to low pass filter 37 which attenuates the chrominance frequency band and passes the missing luminance cross component information. The luminance cross components Y' on connection 34 are delayed in element 35 by a time period equivalent to the group delay of low pass filter 37 and then combined in signal combining circuitry 38 with the luminance cross components from low pass filter 37.

The broadband compensating luminance information from circuit 38 is applied to a second input of signal combining circuit 39 to correct the luminance signal from frame comb 21 for motion induced artifacts. The corrected luminance signal is available on output connection 42.

Chrominance signal may be produced by subtracting the corrected luminance signal from uncombed composite signal. Composite signal at connection 20 is applied to delay element 32 having a delay period t1 equal to the combined delays imposed by the circuit elements between connection 23 and connection 42. Delayed composite signal from delay element 32 is applied as a minuend to signal subtraction circuit 40. Corrected luminance signal from connection 42 is applied as subtrahend to signal subtraction circuit 40. The output signal from circuit 40 is equal to composite signal minus luminance signal or equals the chrominance component of the composite signal.

Figure 5:
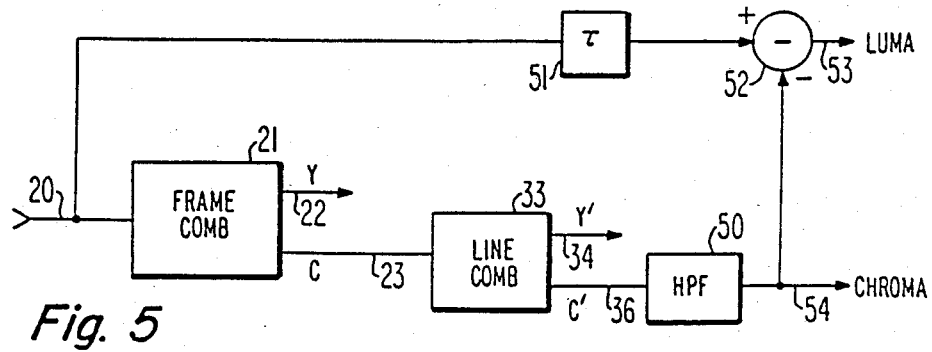

Comb filtered luminance and chrominance signal may also be generated in a manner complementary to the method performed by the FIG. 4 circuit by first generating a comb filtered chrominance signal and subtracting it from composite signal to produce the luminance signal. FIG. 5 illustrates circuitry to perform this function.

In FIG. 5, frame and line comb filtered chrominance signal at connection 36 is applied to filter 50 which has a frequency passband arranged to pass the chrominance frequency spectrum. Filter 50 may be a bandpass filter with a chrominance signal passband. Alternatively, filter 50 may be a high pass filter with a low frequency cut off at the low frequency end of the chrominance signal frequency spectrum. However, the high pass filter is only appropriate if the composite signal has been prefiltered to remove frequency components above the video signal frequency band.

Signal from filter 50 on connection 54 corresponds to chrominance signal with motion induced luminance cross components substantially eliminated. This chrominance signal is applied to subtraction circuit 52. Composite video from terminal 20 is delayed in delay element 51 and then applied to subtraction circuit 52. Delay element 51 is designed to compensate the composite video signal for the signal processing delays incurred by the chrominance signal in passing through comb filter 33 and filter 50. That is, delay element 51 spatially aligns the composite video signal with the comb filtered chrominance available at connection 54.

Subtraction circuit 52 subtracts the comb filtered chrominance signal from the delayed composite signal to produce the luminance component of the composite signal at terminal 53. The luminance signal produced at terminal 53 contains substantially no motion induced luminance distortion.

What is claimed is:

1. A frame comb filter system including circuitry for reducing motion induced comb filtered signal distortion, comprising:
   a source of video signal;
   a frame comb filter having first and second output terminals for producing comb filtered luminance signal and comb filtered chrominance signal respectively;
   an interline comb filter responsive to said comb filtered chrominance signal, said interline comb filter having first and second output terminals at which delayed and non-delayed signals are additively combined and subtractively combined respectively;
   a low pass filter having a passband for rejecting chrominance signal, and having an input terminal coupled to the second output terminal of said interline comb filter;
   signal combining means for combining comb filtered luminance signal from the first output terminal of said frame comb filter, signal from the first output terminal of said interline comb filter and signal from said low pass filter to produce a luminance signal with reduced interframe image motion induced distortion.

2. The frame comb filter system set forth in claim 1 wherein the means for combining includes:
   a first signal adding circuit having first and second input terminals coupled to the first output terminal of said interline comb filter and said low pass filter respectively;
   a second signal adding circuit having first and second input terminals coupled to the first output terminal of said frame comb filter and an output terminal of said first signal adding circuit respectively.

3. The system set forth in claim 1 further including:
   signal combining circuitry having first and second input terminals coupled to said source and to an output terminal of said signal combining means, for subtractively combining signals applied thereto for generating a chrominance component signal from said video signal.

4. A method for correcting frame comb filtered luminance signal including interframe image motion induced artifacts, said frame comb filtered signal being generated by a frame comb filter responsive to composite video signal for producing comb filtered luminance and chrominance signal components, the method comprising:
   interline comb filtering said comb filtered chrominance signal for producing a first interline comb filtered output signal in which the chrominance signal is substantially cancelled, and a second interline comb filtered output signal which includes said comb filtered chrominance signal;
   low pass filtering said second interline comb filter output signal to substantially reject chrominance signal components therein;
   combining the low pass filtered signal, signal from said interline comb filter first output signal, and comb filtered luminance signal from said frame comb filter to produce a corrected luminance signal.

5. Apparatus for enhancing frame comb filtered luminance signal for image motion induced distortion, said luminance signal being derived from composite video signal by a frame comb filter which produces comb filtered luminance and comb filtered chrominance signals, said apparatus comprising:
   an interline comb filter responsive to said comb filtered chrominance signal and producing a comb filtered output signal wherein chrominance signal components are cancelled; and means for combining said interline comb filter output signal and said frame comb filtered luminance signal to generate a luminance signal with reduced motion induced distortion.

6. The apparatus set forth in claim 5 wherein said interline comb filter produces a second comb filtered output signal which contains chrominance signal components and said apparatus further comprises:
a low pass filter responsive to said second interline comb filter output signal and having a passband for rejecting chrominance signal; and
means for combining signal from said low pass filter with said frame comb filtered luminance signal.

7. A video signal processing system for separating luminance and chrominance components of a composite video signal comprising:
a source of composite video signal;
a frame comb filter having an input terminal coupled to said source and having an output terminal at which comb filtered chrominance signal is produced;
a line comb filter having an input terminal coupled to said output terminal of said frame comb filter and having an output terminal at which interline comb filtered chrominance signal is produced;
signal combining means having first and second input signals and an output terminal at which said separated luminance component is produced; and
respective means for coupling said first and second input terminals to said source and said output terminal of the line comb filter respectively.

8. The system set forth in claim 7 wherein said signal combining means is a subtraction circuit connected for subtracting said line comb filtered chrominance signal from composite video signal.

9. The system set forth in claim 8 wherein the means for coupling the line comb filter to the signal combining means includes a filter having a frequency passband to reject signal frequencies below the range of frequencies occupied by said chrominance component.

10. The system set forth in claim 8 wherein the means for coupling said source to said signal combining means includes a delay element for delaying said composite video signal.

* * * * *

UNITED STATES PATENT AND TRADEMARK OFFICE
CERTIFICATE OF CORRECTION

PATENT NO. : 4,597,007

DATED : June 24, 1986

INVENTOR(S) : Glenn A. Reitmeier & Christopher H. Strolle

It is certified that error appears in the above-identified patent and that said Letters Patent is hereby corrected as shown below:

| | |
|---|---|
| Column 4, line 22 | "differential" should be --differentially--. |
| Column 6, line 4 | between "connection" and "delay" insert --22 is applied to both a low pass filter 25 and a signal--. |
| Column 6, line 46 | "t2" should be --$\tau$2--. |
| Column 7, line 15 | "t1" should be --$\tau$1--. |
| Column 10, line 4 | "signals" should be --terminals--. |

Signed and Sealed this

Seventh Day of April, 1987

Attest:

DONALD J. QUIGG

Attesting Officer

Commissioner of Patents and Trademarks